United States Patent [19]
East

[11] 3,826,528
[45] July 30, 1974

[54] ONE MAN MULTI-LEVEL CART

[75] Inventor: Donald East, Greenfield, Ohio

[73] Assignee: Burt Weil, Cincinnati, Ohio

[22] Filed: Sept. 22, 1972

[21] Appl. No.: 291,205

[52] U.S. Cl. ........................................ 296/20, 5/86
[51] Int. Cl. .............................................. A61g 1/02
[58] Field of Search ............................. 296/20; 5/86

[56] References Cited
UNITED STATES PATENTS

| | | | |
|---|---|---|---|
| 2,564,333 | 8/1951 | Kelly | 5/86 |
| 2,596,986 | 5/1952 | Curtis | 296/20 |
| 2,958,873 | 11/1960 | Ferneau | 5/86 |
| 3,057,655 | 10/1962 | Weil | 296/20 |

Primary Examiner—Philip Goodman
Attorney, Agent, or Firm—Wood, Herron & Evans

[57] ABSTRACT

A one man multi-level cart having forward and rearward depending legs and slidable braces for the legs, the braces normally being locked and being releasable by the operator. The forward legs are also slidably mounted to the cart frame. The cart is adapted to be collapsed as by thrusting it into the rear of a vehicle, collapse being effected by the legs swinging rearwardly and their braces sliding along the frame. The level of the cart is adapted to be adjusted, adjustment being effected by the legs spreading apart, through the sliding of the brace for the rear legs and the rearward sliding of the upper end of the forward leg.

14 Claims, 20 Drawing Figures

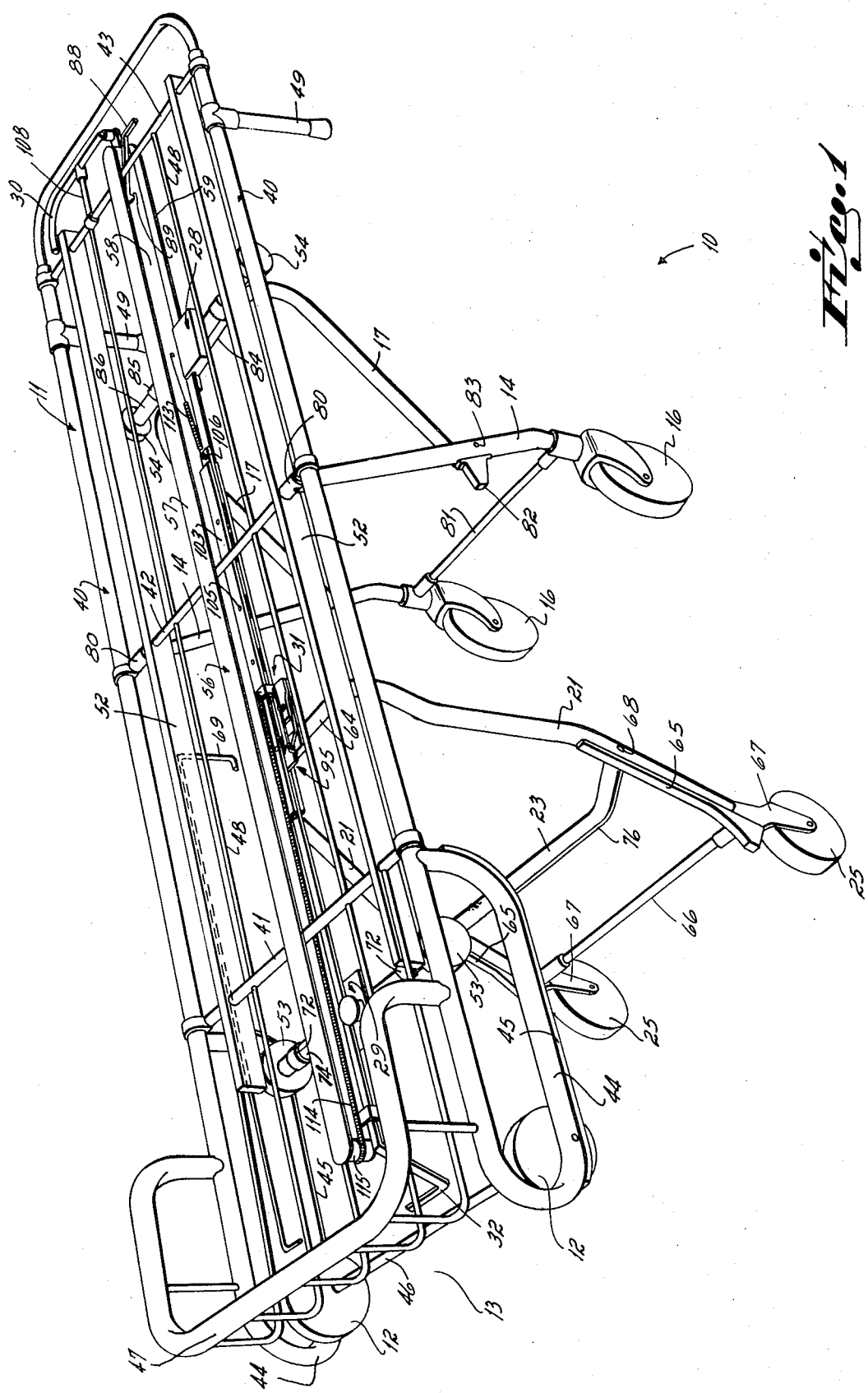

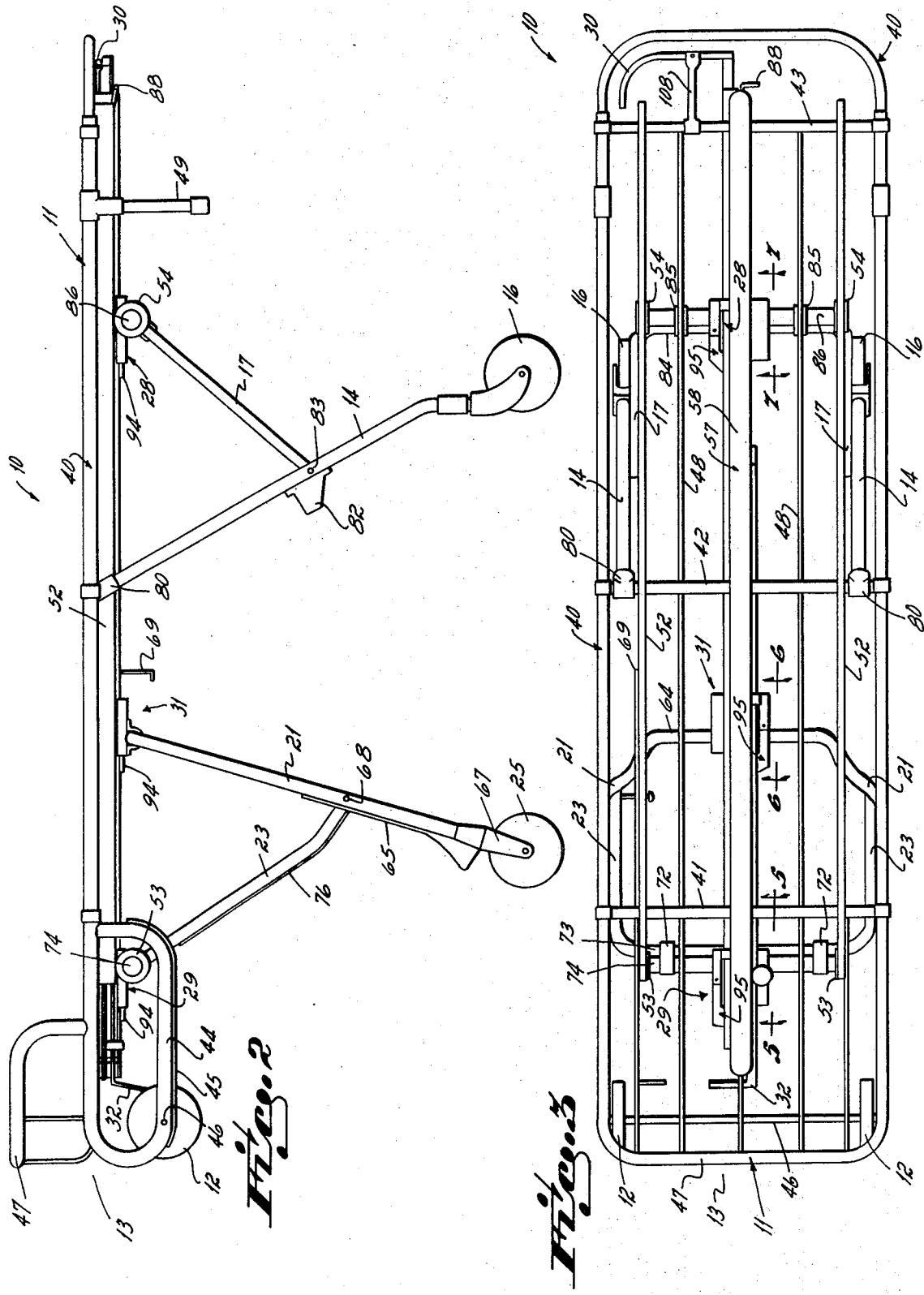

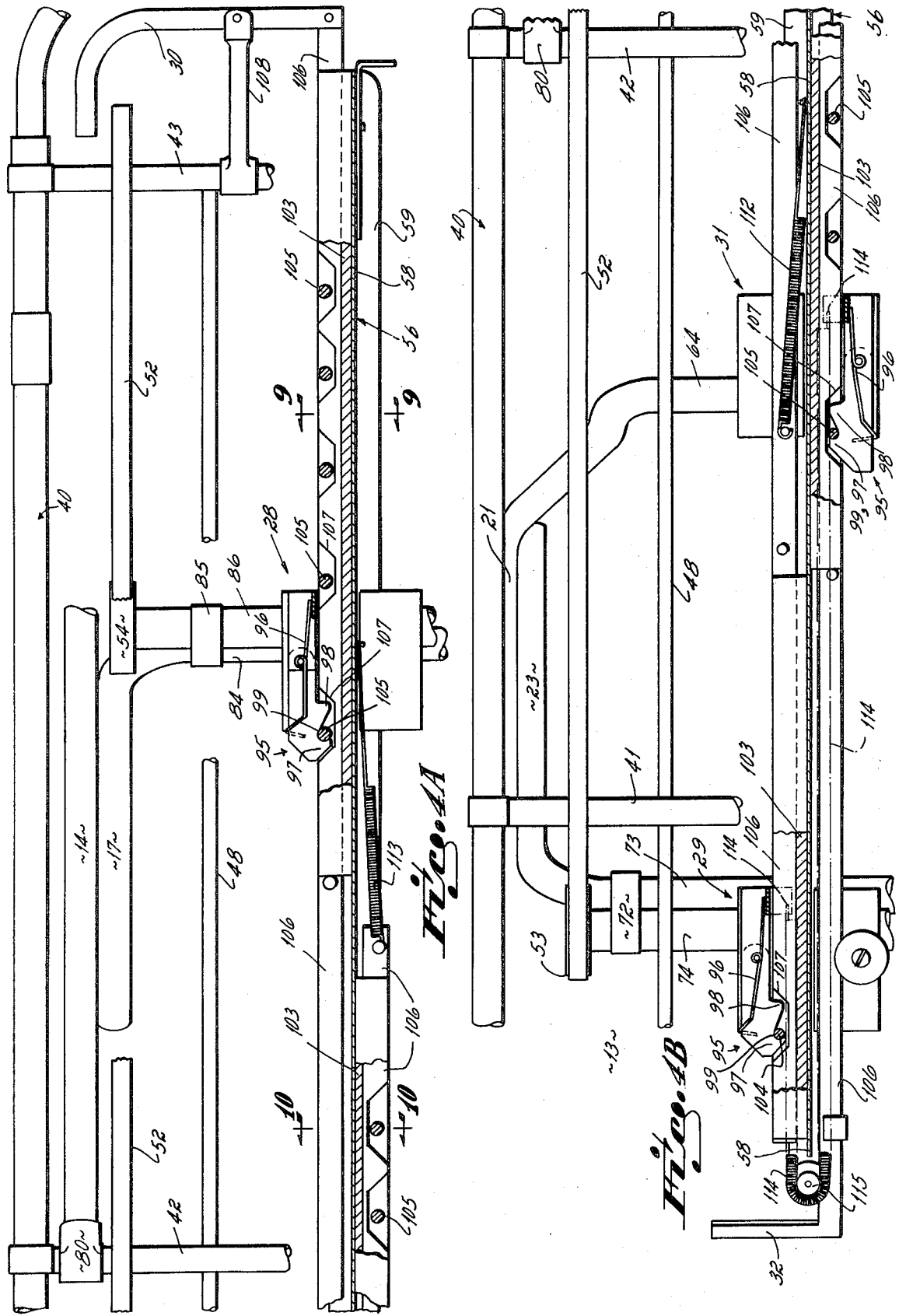

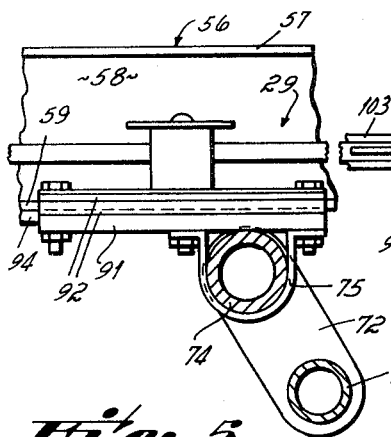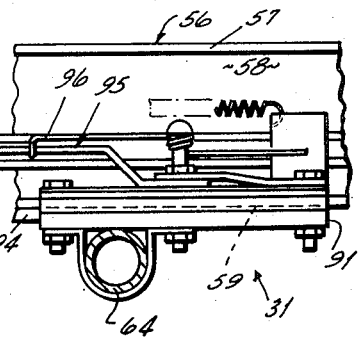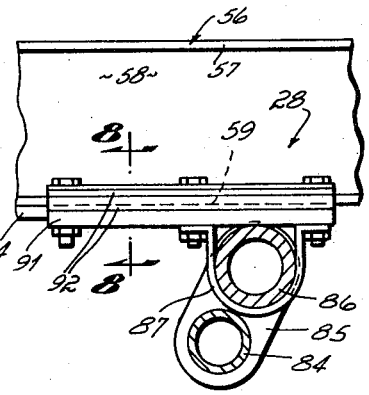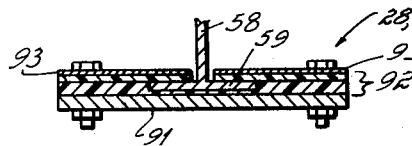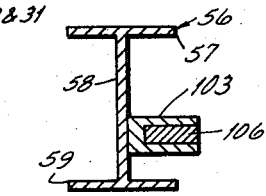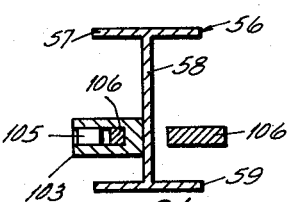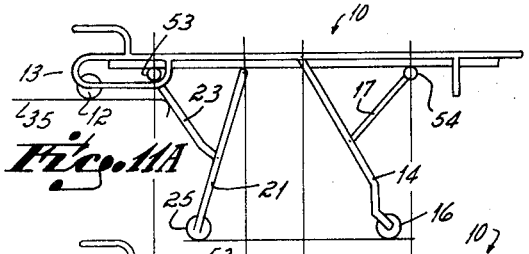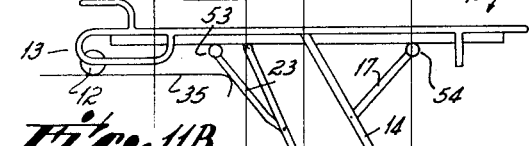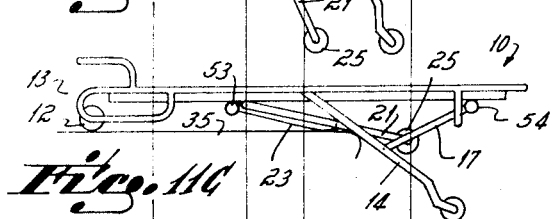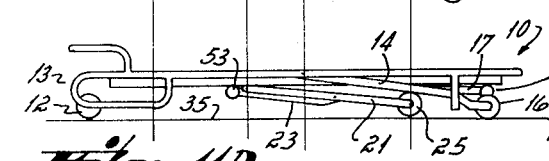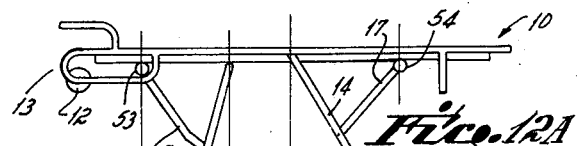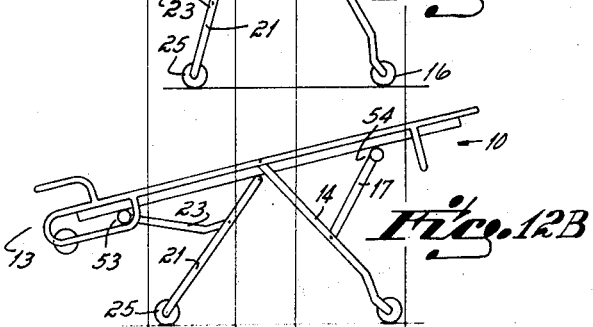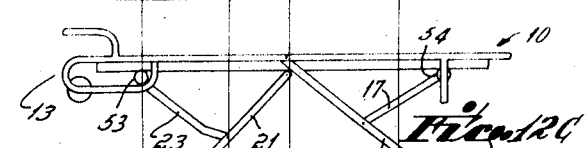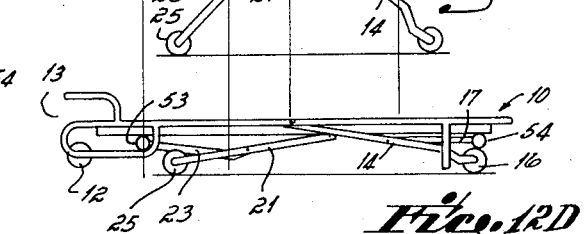

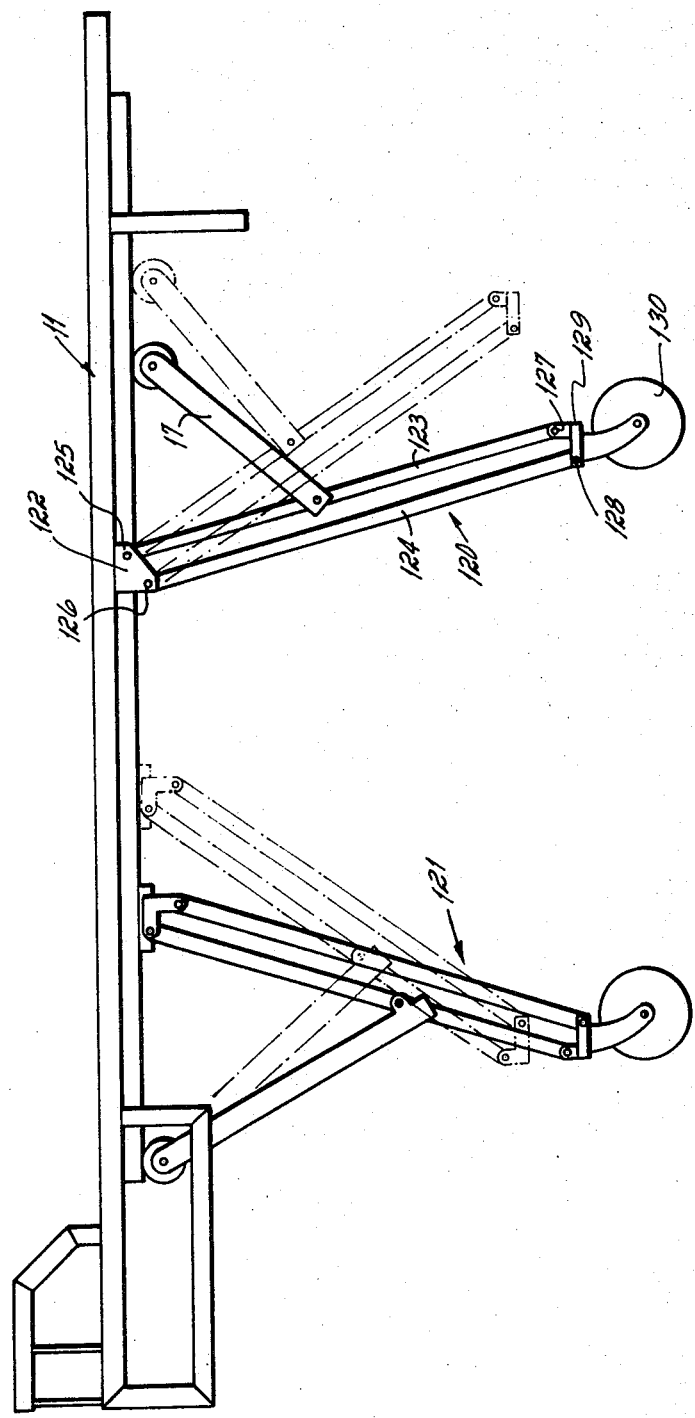

ONE MAN MULTI-LEVEL CART

This invention relates to a multi-level one man cart for, among other things, ambulance and mortuary work. More particularly, the invention is directed to a cart having a bed frame, forward and rearward legs depending from the bed frame, the legs being adapted to move with respect to the cart frame to a collapsed position in which the legs lie against the bed frame enabling the cart to be thrust into an ambulance or other vehicle and the legs being adapted to move to a different attitude to vary the level of the cart.

Carts having one man operation capability have been known as early as 1965 (Weil U.S. Pat. Nos. 2,841,438; 2,877,047; and 2,877,048). The basic concept of these patents resides in providing a bed frame, auxiliary wheels at the forward end of the bed frame, adapting the bed frame, while supported at the rear, to be rolled into a vehicle, forward and rearward legs depending from the bed frame, braces normally locking the legs in a position to hold the bed frame in an erect condition and means for releasing the braces so that the legs can swing rearwardly. Thus, the cart, rolling on the auxiliary wheels, is thrust into a vehicle with the operator standing at the rear of the cart in control of the cart.

It has long been desired to provide such a cart with a multi-level capability, that is, to enable the cart to be positioned with its bed frame at one of a number of selected levels so as to facilitate the transfer of the patient or body from cart to bed. For example, hospital beds are normally quite high and home beds are quite low so that a cart designed to place its frame at the level of a hospital bed would be several inches too high for convenient transfer of a body to or from a home bed.

Multi-level carts are, in general, known. However, the known mechanisms by which the levels of such carts can be varied are not suitable for combination with the one man cart structure and operation.

A recent approach to the multi-level one man cart structure is illustrated in copending application Ser. No. 243,376 of Richard Ferneau, filed Apr. 12, 1972. That application requires two rear stabilizing legs and four forward legs which are in the form of an X frame with one pair of legs being in two sections, the lower section being pivotal with respect to the upper section so as to permit it to swing out of the way as the cart is thrust into a vehicle. The six legged structure of that application is somewhat cumbersome. It has been an objective of the present invention to provide the one man multi-level capability of that application with considerable simplification of structure.

A variant of that Ferneau application is disclosed in the Ferneau and Bourgraf copending application Ser. No. 200,138, filed Nov. 18, 1971, wherein the basic X frame configuration of the Ferneau application is employed, but the rear stabilizing legs are eliminated. The cart of that application has the one man multi-level capability desired, but the base provided by the four wheels at the bottom of the X frame does not have a sufficiently great longitudinal dimension for ambulance and mortuary work.

It has therefore been an objective of the present invention to provide a multi-level one man cart having four legs which are spaced apart a sufficiently great longitudinal dimension for mortuary and ambulance work and which are mounted and braced with respect to the bed frame using simplified structure so as to minimize the cost of construction and complexity of operation and reduce the weight.

More specifically, the invention includes a bed frame in which the rear legs are pivoted to the bed frame and have a diagonal rearwardly extending brace which is slidable with respect to the bed frame. The forward legs have a forwardly extending brace which is slidable with respect to the bed frame and the upper ends of the legs are slidable and pivotal with respect to the frame. The rear legs change their attitude only through the pivoting of the legs and the sliding of the brace for both collapsing and multi-level changes. The forward legs swing rearwardly with the brace sliding when the cart is collapsed to be thrust into a vehicle. However, when the level of the cart is to be changed, the upper end of the brace remains stationary and the upper ends of the legs slide rearwardly when the level of the cart is changed.

Stating it another way and perhaps more simply, when the cart is collapsed, as when it is thrust into a vehicle, both legs swing rearwardly. When the level is changed, however, the lower portion of the legs spreads apart.

Another objective of the invention has been to provide a simplified latch and slide for the sliding portions of the front leg and two braces. Both latches for the braces are operable by a single lever at the rear of the cart so as to enable the leg braces to be released as the cart is thrust into the vehicle by an operator standing at the rear of the cart in full control of the cart. The brace for the forward leg is operable only from the front of the cart to change the level of the cart. This introduces a safety feature wherein the operator must change the level of the cart in a two step procedure by changing one end and then the other end so that the patient is not dropped, or, alternatively, to require the level to be changed by two persons standing at each end of the cart.

It has been another objective of the invention to mount the sliding elements for the leg and braces on a beam extending longitudinally through the center of the frame and to provide lateral stabilizing bars at the sides of the frame with cooperating wheels mounted on the legs and engageable with the frames or bars.

The cart preferably has casters which swivel about a pivotal axis on its rear legs. It is desirable that the vertical axes remain vertical regardless of the level of the cart. If the axes are fixedly related to the legs and the angle of the legs with respect to horizontal changes as the level of the cart changes, the axis will not remain vertical and, hence, the casters will not perform their desired swivel function. It has therefore been an objective of the invention to provide, in a cart of the type described, a parallelogram linkage for mounting the casters so as to maintain vertical the orientation of the casters' axis.

These and other objectives of the invention will become more readily apparent from the following detailed description taken in conjunction with the drawings in which:

FIG. 1 is a perspective view of the invention;
FIG. 2 is a side elevational view thereof;
FIG. 3 is a top plan view thereof;
FIG. 4A is an enlarged fragmentary view similar to one portion of FIG. 3;
FIG. 4B is a continuation of FIG. 4A;

FIG. 5 is a cross-sectional view taken on lines 5—5 of FIG. 3;

FIG. 6 is a cross-sectional view taken on lines 6—6 of FIG. 3;

FIG. 7 is a cross-sectional view taken on lines 7—7 of FIG. 3;

FIG. 8 is a cross-sectional view taken on lines 8—8 of FIG. 7;

FIG. 9 is a cross-sectional view taken on lines 9—9 of FIG. 4A;

FIG. 10 is a cross-sectional view taken on lines 10—10 of FIG. 4A;

FIGS. 11A–11D are diagrammatic side elevational views

FIGS. 12A–12D are diagrammatic side elevational views similar to FIGS. 11A–11D but illustrating the other types of operation to which it is adapted; and FIG. 13 is a side elevational view of a cart having an alternative leg structure.

GENERAL ORGANIZATION

The cart of the invention indicated at 10 includes a bed frame 11 having a pair of auxiliary wheels 12 mounted at its forward end 13. A pair of rear legs 14 are pivotally mounted on the frame 11 and have casters 16 swiveling about vertical axes mounted at their lower ends. A diagonal brace 17 is connected at its lower ends to the rear legs 14 and is slidably and pivotally mounted at its upper end on the frame 11.

Forward of the rear legs 14 are a pair of front legs 21 whose upper ends are pivotally and slidably mounted on the frame 11. A brace 23 is pivoted at its lower ends centrally to the front legs 21 and at its upper ends is slidably and pivotally mounted to the frame. A pair of wheels 25 are mounted on the lower ends of the legs 21.

The rear brace 17 has a slidable mount 28 which is releasably latched to the frame 11 and the front brace 23 has a slidable mount 29 which is releasably latched to the frame. An operating handle 30 at the rear of the cart is operably connected, as will be described below, to the slides of the braces 28, 29 so as to release the latches and permit the braces 17, 23 to slide. The front leg 21 has a slide 31 at its upper end which is releasably latched to the frame 11. An operating handle 32 at the front 13 of the cart is operable to release the leg slide 31.

In general, the cart is adapted for two types of operations. The first is the one man operation of thrusting the cart into a vehicle. In that operation, as illustrated in FIGS. 11A–11D, the cart is rolled to the rear of the vehicle until the auxiliary wheels 12 rest upon a deck 35 which is to receive the cart. The operator, standing at the rear of the cart and in full control of it, operates the lever 30 to release the two latches on the brace slides 28, 29 and begins to thrust the cart into the vehicle. The forward thrust of the cart causes the front brace 23 to engage the vehicle structure and begin to slide rearwardly as the front legs 21 pivot rearwardly. The front legs 21 pivot to a position closely adjacent the underside of the frame 11, and as the thrust of the cart is continued, the rear legs 14 are engaged by the vehicle. Due to the release of the rear brace 28, the rear legs will swing up against the frame to permit the cart to be thrust into the vehicle.

In the second operation, as illustrated in FIGS. 12A–12D, the level of the cart is changed. In a one man operation, the operator first operates the handle 32 at the front of the cart to release the leg brace 23 and positions the front end of the cart at the desired level. He then moves to the rear of the cart and operates the handle 30 to release the brace 17 at the rear of the cart to lower the rear of the cart to the same level as the front of the cart. The brace 23 at the front of the cart is also released by the operation of the handle 30 at the rear of the cart, but there will be no movement of the slide 29 because the weight of the cart causes the slide to remain in engagement with an abutment on the frame.

The Frame

The frame 11, as shown in FIGS. 1–3, is generally rectangular and includes an elongated U-shaped tubular member 40 which is open at its forward end and which is transversely braced by a transverse front tube 41 fixed to the longitudinal legs 42 of the tubular frame member 40, a central tube 42 fixed at its ends to the legs of the tubular frame member 40 and a rear transverse tube 43 fixed at its ends to the tubular frame member 40.

The legs of the tubular frame 40, at the forward end of the cart, are turned back upon themselves and secured to the tubular frame member to form downwardly depending loops 44. The lower surfaces of the loops are lined with nylon skids 45 which provide a sliding engagement with steps when the cart is transported up and down steps in a collapsed condition. A transverse axle 46 is fixed to the lower sections of the loops 44 and the auxiliary wheels 12 are mounted on that axle. A generally U-shaped foot rail 47 is mounted at the front end of the tubular frame member 40 above the auxiliary wheels 12. At the rear end of the frame are two depending posts 49 upon which the frame 11 rests when the legs have been fully collapsed. Longitudinal supports 48 extend from the rear to the front of the cart to support a mattress (not shown) overlying the frame.

Two longitudinally extending stabilizing rails 52 are mounted to the transverse tubes 41–43. The rails 52 are engaged by front and rear nylon rollers 53 and 54 which are secured to the upper ends of the front and rear braces 23 and 17 to provide lateral stability to the cart and to permit single slides for the braces located in the center of the frame without sacrificing the stability of the cart.

A centrally located longitudinally extending I-beam 56 is secured to the three transverse tubes 41–43, the I-beam has an upper flange 57, a web 58 and a lower flange 59, the tubes passing through the upper half of the web leaving the lower half of the beam free of obstruction to accommodate the slides and springs associated therewith.

The Forward Leg and Brace Structure

The front pair of legs 21 is formed from a single U-shaped tubular member whose bight portion 64 is secured to the slide 31. The lower end portion of each leg 21 has a nylon skid 65 fixed to it, the skid being curved away from the leg to help cause the leg to swing up and clear the wheels 25 as the cart is thrust into the vehicle. A transverse tubular brace 66 is connected to wheel mounts 67 fixed at the lower ends of the legs 21 to reinforce the legs.

The front brace 23 is U-shaped having its free ends pivoted by bolts 68 to the front legs 21. The bolt 68 on one of the legs projects beyond the leg to permit it to be captured by a leg lock 69 slidably mounted on one of the stabilizing rails when the frame has been completely lowered to the ground in the all level mode with the upper end of the front leg slid rearwardly.

A fitting 72 is pinned to each side of the bight 73 portion of the front brace 23 and a transversely extending tubular support 74 is pinned in each fitting 72. Rollers 53 are rotatably mounted on the tubular support 74 underlying the rails 52 mounted on the frame to serve as lateral stabilizers for the brace 23. The slide block 29 is pivoted in the center of the transverse support 74 by a U-shaped strap 75 (FIG. 5). Each leg of the U-shaped front brace 23 has a nylon slide 76 extending substantially its full length to assist it as it slides into the vehicle.

The Rear Legs

The rear legs 14 are mounted on the frame, each leg having a T fitting 80 pivotally mounted on the central transverse tube 42. The caster fitting 16 is mounted on the lower end of each leg, the lower ends of the legs being joined by a transverse tube 81. A nylon block 82 is fixed to each leg 14 intermediate its ends to be sure that the cart is not resting on the swivel casters when in collapsed condition. The U-shaped brace 17 has its lower ends pivotally mounted centrally of the legs by bolts 83. The bight portion 84 of the brace 17 is pinned to two lateral fittings 85, the lateral fittings being pinned to a tubular support 86. The tubular support carries, at each end, the nylon rollers 54 underlying the rails 52 to provide the lateral stability for the brace 17. The tubular support 86 is pivoted to the slide block 28 by a U-shaped strap 87 (FIG. 7) similar to that described in connection with the front brace 23.

A lock 88 for the rear legs 14 is pivoted on the beam 56, the lock having a hook 89 which engages the slide 28 when it is at its rearwardmost position to hold the legs in a collapsed position.

The Slides and Latches

The latches, as best seen in FIGS. 1, 3, 4A, 4B, and 6, for the braces 17, 23 and front leg 21, are substantially identical in construction and operation, and only one will be described. As best seen in FIG. 8, each slide block has a lower plate 91, a nylon-laminated block 92 forming a T slot surrounding the lower flange 59 of the central beam 56 and two plates 93, one on each side of the beam, mounted on top of the nylon block. The two plates 93 are bolted to the lower plate 91 to sandwich the nylon block 92 therebetween. Each slide block is fixed against movement in a non-operative direction by an abutment block 94 fixed to the lower flange 59 of the beam 56. The latch 95 is an elongated element (FIGS. 4A and 4B) which is pivoted at one end to one of the upper plates 93. A spring 96 urges the free or latch end 97 of the latch toward the beam 56. The latch has an edge 98, facing the beam, which is configurated to provide a cam follower surface and a latching surface 99.

A channel 103 is fixed to the web 58 and opens to the side of the frame, the free end 97 of the latch being swingable in and out of the channel. A single pin 104 projects through the channel 103 for the front brace 23 and a plurality of pins 105, one associated with each level of the cart, projects through the channels associated with the rear brace 17 and front leg 21. A slide bar 106 having as many cam surfaces 107 as required, is associated with each latch 95 and is slidably mounted in the channel. As the slide bar is longitudinally moved by either one of the operating handles 30 or 32, it cams the latch 95 out of the way of the pin and permits the slide to move freely.

As viewed from the rear of the cart, and as best shown in FIGS. 4A and 4B, on the right side of the beam 56 a single slide bar 106 passes through the channels 103 associated with the latches for the two braces 17, 23. The operating handle 30 is pivoted at one end to the slide bar 106 and intermediate its ends to the frame 11 on a short fitting 108 so that an operator standing at the rear of the cart with his hands on the frame may reach with his fingers and pull the operating lever 30 toward him to cause the slide bar to slide forwardly, camming both latches 95 out of engagement with the respective pins 104, 105. A spring 112 connected between the slide bar 106 and the beam web 58 causes the slide bar to return to its normal position.

At the left side, again as viewed from the rear of the cart, a second slide bar 106 passes through the channel 103 associated with the front leg slide 31. That slide bar is extended at its front end to provide an L-shaped handle 32 adjacent the axle 46 for the auxiliary wheels 12, the handle 32 being operated by a person having his hand gripping around the axle. When the slide is pulled toward the front of the cart, it cams the latch 95 associated with the front leg 21 out of engagement wih the pin 105 to permit the front leg slide 31 to move freely. A spring 113 is connected between the web 58 and the slide bar 106.

The rear legs 14 have a gravity return to their normally erect position. The front leg and brace slides 29 and 31 have a tension spring 114 connected between them, the spring passing around a roller 115 rotatably mounted at the front of the beam 56. The spring 114 urges the slides 29 and 31 in a forward direction toward their respective abutments 94.

Modified Leg Structure

It can be observed by reference to FIG. 2, for example, that as the level of the cart is lowered so that the angle of the leg 14 is changed with respect to the cart, the axis of the caster 16 which is normally vertical will be inclined to the vertical. When inclined, the caster does not swivel properly and, hence, the steering of the cart is made more difficult.

As shown in FIG. 13, the invention contemplates a modified leg structure for both of the rear and front legs for mounting the swivel casters in order to maintain their axes vertical regardless of the angular position of the legs with respect to the bed frame. Basically, the legs are formed as a parallelogram structure 120 at the rear of the cart and 121 in the front of the cart with the casters mounted on one side of the parallelogram which is maintained horizontal.

At the rear of the cart, on each side, a bracket 122 is fixed to the frame 11. Two parallel rods 123 and 124 are pivoted at 125 and 126, respectively, to the bracket 122. The lower ends of the rods 123, 124 are pivoted at 127 and 128, respectively, on a bracket 129. The bracket 129 has a caster 130 connected to it to swivel about a vertical axis. The rear brace 17 is pivotally connected to the rod 123.

By comparing the full line position of the rear legs to the broken line position of the rear legs, it can be seen that regardless of the angular position of the legs with respect to the bed frame, the bracket 129 which supports the swivel caster always maintains the same attitude with respect to the frame, thereby maintaining the axis of the swivel caster in a vertical orientation.

The front legs 121 are constructed in substantially the same way as the rear legs 120 and, hence, no detailed description is required. It can be observed by comparing the full line to the broken line positions to the front legs 121 that the parallelogram structure functions to maintain the axis of the swivel caster in a vertical orientation.

Operation

To illustrate the operation, let it be assumed that the patient is to be removed from a hospital bed, transported by an ambulance to his home and placed in his home bed. At the hospital, the cart is in its highest position as shown in FIG. 11A. In this position, the frame should be at substantially the same level as the hospital bed and the patient can be slid from the bed directly onto the cart. The cart may then be wheeled to the ambulance and rolled into the vehicle.

As shown in FIG. 11B, the operator standing at the rear of the cart thrusts the auxiliary wheels 12 on the deck 35 of the vehicle whereby the front end of the cart is supported. With the cart supported with the wheels and supported at the rear end by the operator, the operator operates the latch handle 30 which releases the latches for the front and rear braces 23, 17. As the operator continues to thrust the cart forward, the cart engages the nylon slides 76 on the front brace 23 and cams the front brace in a rearward direction. As thrust is continued, the deck 35 of the vehicle engages the slides 65 on the front legs 21 and swings them rearwardly (FIG. 11C). Final thrust of the cart into the vehicle causes the vehicle to engage the rear legs 14 to swing them rearwardly and upwardly as the brace 17 slides rearwardly along the frame (FIG. 11D).

At the patient's home the cart is withdrawn from the vehicle. As the cart is started out of the vehicle, the rear legs 14 are caused by gravity to fall to their full, erect position in which position they are automatically latched by the latch 95 on the rear brace slide 28. Continued withdrawal frees the front legs 21 which are also caused by gravity to drop to full, erect position during which the front end of the cart is supported by the auxiliary wheels 12. When both legs are in their fully erect position, the cart is fully supported and complete withdrawal can be effected (FIG. 11A).

Inside the patient's home, the cart can be lowered to home bed height. As shown in FIGS. 12A–12C, this is accomplished by first operating the handle 32 at the forward end 13 of the cart with the operator gripping the axle 46 for the auxiliary wheels to maintain control of the cart. Pulling in a forward direction on the handle causes the slide bar 106 to cam the latch 95 on the leg slide 31 out of contact with its pin 105 so that the front end of the cart can be lowered with the upper end of the front legs sliding rearwardly. When the desired level has been reached, the handle is released to permit the latch 95 to swing into the channel 103 and into engagement with another of the latching pins 105 (FIG. 12B). The operator then moves to the rear of the cart and performs a similar operation on the latch associated with the rear brace. With his hand around the frame and fingers on the latch operating handle 30, he slides the latch bar 106 in a forward direciton to cam the latch 95 out of the channel 103. The rear end of the cart is then lowered until the desired position is attained (FIG. 12C). The handle is released and the spring 112 pulls the latch bar out of the way to permit the latch to drop into engagement with another latch pin 105.

On another occasion it may be necessary to lift a patient from ground level into the ambulance. In that event, the level of the cart is changed as described above by lowering the legs in spread-eagle fashion to their lowermost position where they lie substantially flush against the frame (FIG. 12D). There the front legs are locked by pulling the lock 69 forward into engagement with the pivot bolt 68 extension on the lower end of the front brace 23. The rear legs are locked in position by the manipulating of the latch 88 at the rear of the cart so that it hooks over the slide 28 on the rear brace 17. The patient can be slid onto the cart and the cart carried as a stretcher, with the legs held by their locks up against the frame. This condition of the stretcher is also useful in any other situation where it is necessary to carry the cart as a stretcher rather than rolling it.

Having described my invention, I claim:

1. A one man cart comprising,
   a bed frame having auxiliary wheels on the front end of said frame,
   front legs depending from said frame,
   means mounting the upper ends of said legs to said frame for pivotal and longitudinal sliding movement with respect to said frame,
   rear legs pivotally mounted on said frame,
   a diagonal front brace for said front legs having a lower end pivoted centrally to said front legs and means slidably and pivotally mounting the upper end on said frame forward of said front legs,
   a diagonal rear brace for said rear legs having a lower end pivoted to said rear legs and means slidably and pivotally mounting the upper end on said frame rearward of said rear legs,
   and selectively operable releasable means locking each of said slidable mounting means to said frame, said legs, braces and mounting means collectively permitting said legs to swing rearwardly as the cart is thrust into a vehicle, and permitting said legs to swing outwardly in opposite directions to lower the level of said cart.

2. A one man cart comprising,
   a bed frame having auxiliary wheels on the front end of said frame,
   front and rear legs pivotally mounted on said frame,
   releasable means for bracing said front and rear legs,
   means for mounting said legs and bracing means to permit said legs to swing rearwardly to thrust a cart into a vehicle and to permit said legs to swing outwardly in opposite directions for changing the level of the cart.

3. A cart as in claim 1 further comprising,
   a tension spring interconnecting said sliding means on said front leg and front brace, respectively, to urge said leg and brace toward an erect condition.

4. A cart as in claim 1 in which said front legs are downwardly and forwardly inclined and said rear legs are downwardly and rearwardly inclined when said cart is in its erect condition.

5. A cart as in claim 1 further comprising, operating means at the rear of said cart and connected to said releasable means on said braces for releasing said braces from the rear of the cart, operating means mounted at the front of said cart and connected to releasable means on said front leg to release said sliding means from the front of the cart.

6. A cart as in claim 1 further comprising, wheels on lower ends of said front legs, swivel casters on said lower ends of said rear legs and a parallelogram linkage for each rear leg, said parallelogram linkage mounting said casters to said rear legs to maintain an operative orientation of said swivel casters at any level of said bed frame.

7. A multi-level cart having a horizontal frame, front and rear legs depending from said frame and means for bracing said legs in any of a plurality of angular positions with respect to said frame, casters having a vertical swivel axis on at least said rear legs characterized in that said rear legs are constituted by a parallelogram linkage having upper and lower horizontal brackets and a pair of spaced parallel rods pivoted at each end to said brackets, said casters being mounted on said lower brackets.

8. A cart as in claim 1 in which said mounting means comprises, a central longitudinally-extending beam mounted on said frame and having a lower laterally-projecting flange, and a slide block having an inverted T-slot embracing said flange to form said sliding means.

9. A cart as in claim 8 further comprising, a channel mounted on said beam and extending parallel to said flange, lock pins extending through said channel and a latch pivoted on said sliding means and engageable with said pins, spring means urging said latch toward said pins, and means for moving said latch away from said pins.

10. A cart as in claim 9 further comprising, a bar slidably mounted in said channel, cam surfaces on said bar, follower surfaces on said latch, and means for sliding said bar in a first direction to cam said latches out of engagement with said pins.

11. A cart as in claim 10 further comprising, spring means returning said bar in the opposite direction.

12. A one man cart comprising, a bed frame having auxiliary wheels on the front end of said frame, front legs pivotally mounted on said frame, rear legs pivotally mounted on said frame, a diagonal front brace for each said front leg having its lower end pivoted centrally to said front leg, means slidably and pivotally mounting the upper end of each said brace on said frame forward of said front legs, a diagonal rear brace for each said rear leg having a lower end pivoted to said rear leg, means slidably and pivotally mounting the upper end of each said rear brace on said frame rearwardly of said rear legs, each said brace having a roller mounted on its upper end, a longitudinally extending bar mounted on each side of said frame and engageable by said rollers, and selectively operable releasable means locking each said slidably mounting means.

13. A one man cart comprising, a bed frame having auxiliary wheels on the front end of said frame, front legs pivotally mounted on said frame, rear legs pivotally mounted on said frame, a diagonal front brace for said front legs having lower end pivoted centrally to said front legs, means slidably and pivotally mounting the upper end of said brace on said frame forward of said front legs, a diagonal rear brace for said rear legs having a lower end pivoted to said rear legs, means slidably and pivotally mounting the upper end of said rear brace on said frame rearwardly of said rear legs, each said brace comprising:

a U-shaped element having its ends connected centrally of its respective legs and having the central portion of its upper bight portion slidably mounted on said bed frame, rollers mounted on said brace laterally of said sliding means, and longitudinal bars mounted on said bed frame overlying said rollers and engageable by said rollers, and selectively operable releasable means locking each said slidably mounting means.

14. A one man cart comprising, a bed frame having auxiliary wheels on the front end of said frame, front legs pivotally mounted on said frame, rear legs pivotally mounted on said frame, a diagonal front brace for said front legs having lower end pivoted centrally to said front legs, means slidably and pivotally mounting the upper end of said brace on said frame forward of said front legs, a diagonal rear brace for said legs having a lower end pivoted to said rear legs, means slidably and pivotally mounting the upper end of said rear brace on said frame rearwardly of said rear legs, abutment means mounted on said frame forward of each said slidable means to restrict forward movement of said slidable means, and selectively operable releasable means locking each said slidably mounting means.

* * * * *

UNITED STATES PATENT OFFICE
CERTIFICATE OF CORRECTION

Patent No. 3,826,528          Dated July 30, 1974

Inventor(s) Donald East

It is certified that error appears in the above-identified patent and that said Letters Patent are hereby corrected as shown below:

Column 1, line 14, "1965" should be -- 1956 --

Claim 14, line 50, after "said," insert -- rear --

Signed and sealed this 26th day of November 1974.

(SEAL)
Attest:

McCOY M. GIBSON JR.
Attesting Officer

C. MARSHALL DANN
Commissioner of Patents